United States Patent [19]

O'Farrill et al.

[11] Patent Number: 5,528,328
[45] Date of Patent: Jun. 18, 1996

[54] CAMERA FILTER QUICK RELEASE ADAPTER

[76] Inventors: Dave O'Farrill, 530 Pine St., Chico, Calif. 95928; Ralph S. Colombo, P. O. Box 1158, Magalia, Calif. 95954

[21] Appl. No.: 391,062

[22] Filed: Feb. 21, 1995

[51] Int. Cl.[6] .................................................. G03B 11/00
[52] U.S. Cl. .......................................................... 354/295
[58] Field of Search .................................... 354/295, 296; 359/892

[56] References Cited

U.S. PATENT DOCUMENTS 5,040,011  8/1991  Tiffen ....................................... 354/295

Primary Examiner—Howard B. Blankenship

[57] ABSTRACT

A camera filter quick release adapter has mobile thread grips in a lower unthreaded guide rim section of a ring fitting the female threads of a camera lens collar. The thread grips are operated to move inward and outward by release tabs above them in an upper section of the same ring. The two parts are attached by a backing and a circular bias spring holds them protruded outward through openings for each in the ring sections. The lower section does not have threads and slips inside the camera lens collar acting as a guide rim. For installing the adapter of this invention in the camera lens collar, the release tabs are manually depressed pushing the thread grips back from connecting with the camera lens collar threads until the lower section of the adapter seats in the base of the lens collar. The tabs are than released, the circular bias spring pushes the thread grips into the threads of the camera lens collar securing the adapter of this invention to the front of the camera lens. For quick releasing, the release tabs are pressed in pushing the thread grips away from the camera lens collar threads releasing the adapter. The ring of this adapter can be quickly removed and quickly installed along with a filter or other compatible photographic equipment attached to it.

5 Claims, 4 Drawing Sheets

CAMERA FILTER QUICK RELEASE ADAPTER

BACKGROUND OF THE INVENTION

1. Field of the Invention

This invention relates to devices for attaching filters, filter rings, and other auxiliary fittings to a camera lens. The present invention is particularly directed towards a snap-on connection for quickly changing filters, filter rings, and standard threaded photographic equipment. The present invention also is a quick release for changing filters and other compatible photographic equipment.

2. Description of the Prior Art

Most filters and filter rings have an industry standard screw-on threaded fitting for attaching accessories to the lens of a camera and between one accessory and another. In past art patents various types of connections are seen including screw-ins, slip-ons, bayonet, and attachment by adapter ring. Until the present invention, a quick-on, quick-off adapter ring or filter ring does not seem to have been considered.

SUMMARY OF THE INVENTION

Therefore, in practicing our invention, we provide a snap-on adapter ring for filter attachment to the female threads cut into camera lenses. Our ring has quick-on and quick-off mechanics that allows the ring to be quickly snapped into the camera lens female threads. The ring of our invention can also be used with other rings as a quick-on adapter ring. The present invention can be fitted to other rings such as the filter ring or any compatible photographic equipment. Our ring attachment invention is particularly adapted for quick-changing camera filters as needed without the task of screwing them into and out of the camera lens threads or any other compatible photographic equipment.

It is then a principal object of the present invention to provide mechanics allowing for snap-on attachment of an adapter ring to the lens of a camera.

Another object of our invention is to provide snap-on mechanics in a ring attachment for a camera lens that can be manually manipulated to snap off of the camera lens without unscrewing the ring.

A further object of this invention is to provide mechanics that can be integrated into compatible photographic equipment including camera filters, lens hoods and other standard threaded compatible accessories so the accessories do not have to be screwed into each other or the camera lens threads and removing or changing can be done quickly.

A still further object of our invention is providing snap-on mechanics in a camera adapter ring allowing the ring to be used with other rings and for affixing a variety of auxiliary devices attached together and for attaching them to a camera lens.

Other objects and the many advantages of the present invention will be understood by reading numbered parts described in the specification and viewing them illustrated in the included drawings.

BRIEF DESCRIPTION OF THE DRAWINGS

The drawings include:

FIG. 13 showing an open-line drawing of an end section of the adapter ring in accordance with the invention. The release tab and thread grip structure are shown pressed outward by a bias spring so the thread grip will interlock into the female threads of a camera lens or the female locks of other standard camera equipment, and FIG. 14 showing the release tab and thread grip structure pressed inward manually against the bias spring to release the thread grips from female threads of any device it has been installed on.

DESCRIPTION OF THE PREFERRED EMBODIMENT

Figure 1:
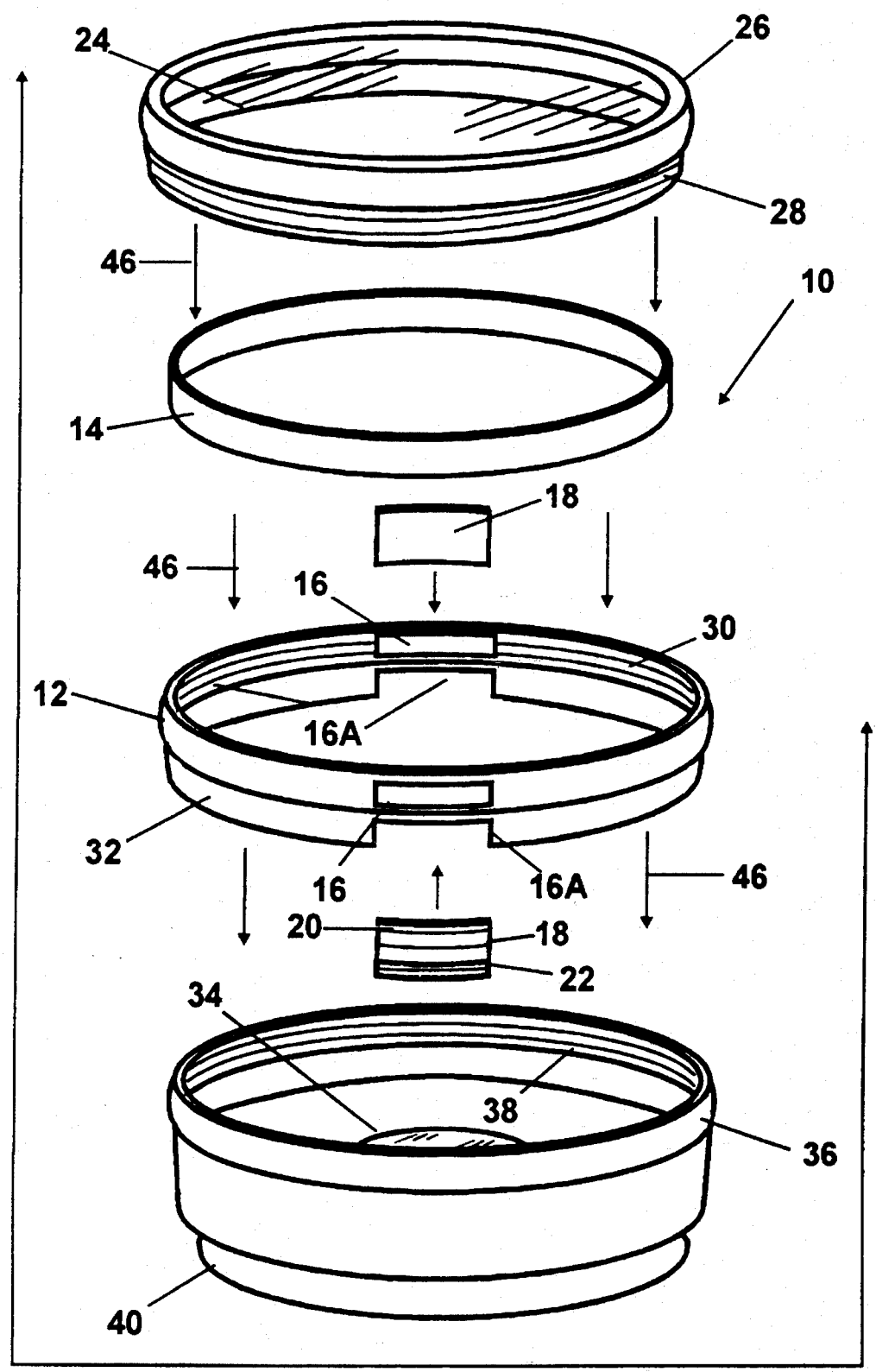
FIG. 1 showing an exploded view of a quick-release adapter for attachment of a filter ring to a camera lens in accordance with this invention. The filter and filter ring is at the top in this illustration, the separated quick-release adapter parts are in the center, and an illustrative camera lens with normal inside threads is at the bottom.

Referring now to the drawings where the numeral 10 indicates the invention generally and is hereinafter referenced as invention 10. The exploded view in FIG. 1 shows invention 10 with parts separated between a camera lens filter 24 and a camera lens 34. Invention 10 includes adapter ring 12, a collar, with an unthreaded guide rim 32, affixed. Female threads 30 are inside of adapter ring 12. Cut through adapter ring 12 on opposite sides are two rectangular release tab openings 16 positioned above two wider openings 16A. The wider openings, 16A, are not closed at the bottom and are in the angled unthreaded base ring 32 of adapter ring 12. This allows release tab and thread grip structure 18 to fit inside of adapter ring 12 with release tab 20 and thread grip 22 protruding through the openings. When release tab and thread grip structures 18 are positioned inside of adapter ring 12, compression spring 14, a circular flat spring, is installed inside of adapter ring 12 in alignment with angled unthreaded guide rim 32. Compression spring 14 maintains pressure on both release tab and thread grip structures 18 holding them positioned in the openings as previously described. Movement arrows 46 indicate direction of installation and movements of parts. The threading of all rings female and male are standard for the industry and are compatible with each other. The separated parts in FIG. 1 from top to bottom include camera lens filter 24, filter lens collar 26, and filter male threaded base ring 28. The parts showing invention 10 include circular compression spring 14, adapter ring 12 with adapter angled unthreaded guide rim 32 on the under side. Two openings 16 and two openings 16A accommodate insertion of release tab 20 and thread grip 22 which are protruding parts of release tab and threaded grip structure 18. Arrows 46 indicate movement and camera lens 34 is at the bottom in the illustration. Camera lens 34 includes camera lens collar 36 and camera lens to camera attachment 40. Adapter ring 12 has an inside thread, female, 30, and camera collar 36 has an inside female thread 38. Threads 30, 38, and 28 are trade standard and compatible with each other.

Figure 2:
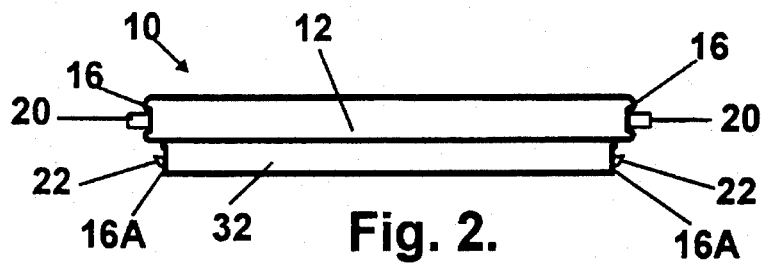
FIG. 2 showing a side profile view of the quick-release ring assembled. The release tabs and the thread grips can be seen protruding from opposite ends of the adapter ring. The lower section is an unthreaded guide rim which allows it to slide easily into the camera lens female threads.
Figure 3:
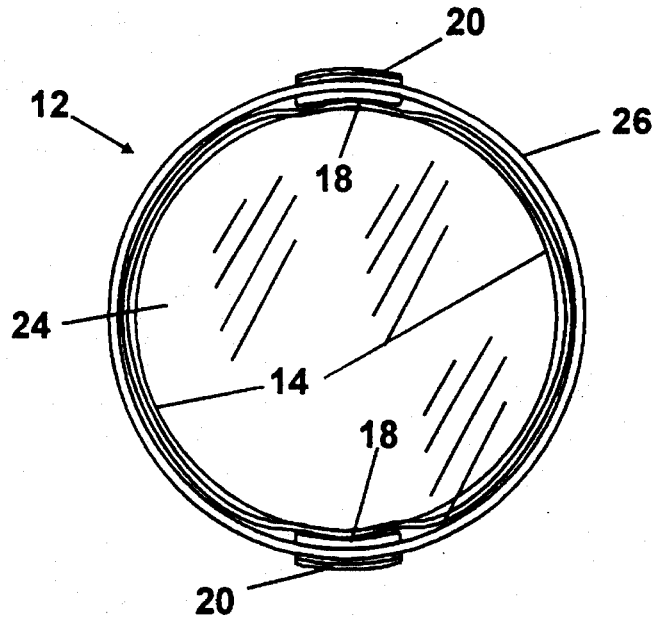
FIG. 3 showing a top plan view of a camera filter with the filter ring attached to the quick-release adapter of the present invention. Male threads on the filter ring screw into female threads inside the quick-release adapter ring.
Figure 4:
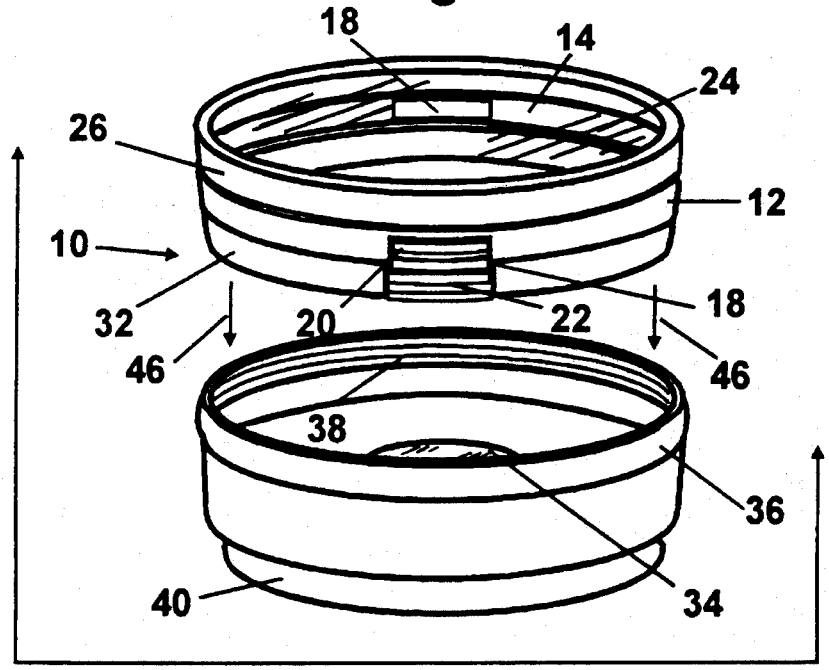
FIG. 4 showing the assembled filter ring and quick-release adapter of this invention positioned above a camera lens ready for attachment. The quick-release adapter ring allows the filter to be snap-fastened to the camera lens without the necessity of screwing the male filter ring threads into the female camera lens threads.

FIG. 2 shows invention 10 in a side view with adapter ring 12 on top and adapter angled unthreaded guide rim 32 on the bottom. Openings 16 and 16 A for release tab 20 and thread grip 22 to protrude from are seen at either end of adapter ring 12 in the drawing. FIG. 3 shows a top plan view of camera filter 24 attached to adapter ring 12. Compression spring 14 can be seen inside the filter collar 26 maintaining pressure on the two release tab and thread grip structures 18. Release tabs 20 protrude out top and bottom from adapter ring 12 which is not seen below the ring of filter 24. FIG. 4 shows adapter ring 12 attached to filter 24 positioned above camera lens 34 ready for quick-on attachment. Unthreaded guide rim 32, without threads slides down inside of camera lens collar 36 and is retained there by thread grips 22 clicking into inner camera lens collar female threads 38. The assemblage of filter 24 and adapter ring 12 can be easily and quickly removed from camera lens collar 36 by manually pinching in on release tabs 20. This moves thread grips 22 back out of contact with camera lens female threads 38 and frees the filter assemblage of filter 24 and adapter ring 12. This attachment and removal of filter 24 via adapter ring 12 is best illustrated in FIGS. 5 and 6.

Figure 5:
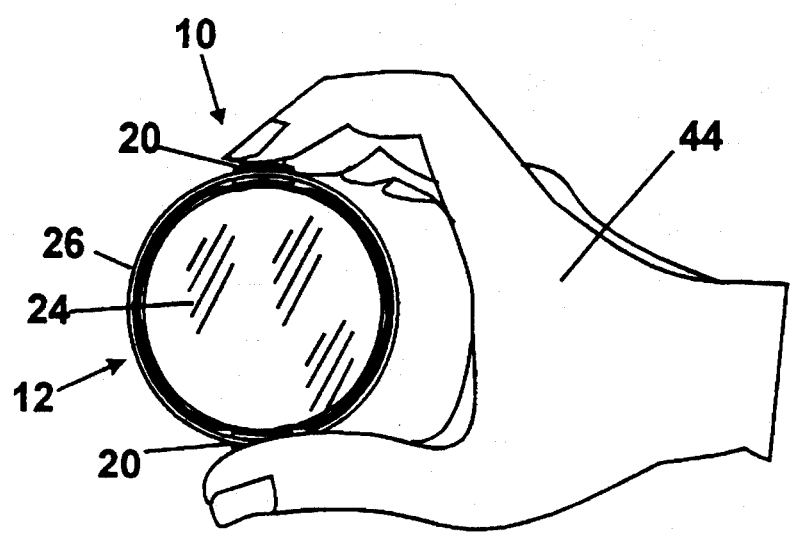
FIG. 5 showing a hand holding a camera filter ring fitted to the quick-release adapter of this invention. The illustration shows how the filter and adapter is held so the users fingers can press in the release tabs. With the release tabs pressed, the unthreaded lower section of the adapter will slide into the camera lens housing threads. When the adapter ring is seated in the camera lens housing, the user releases pressure on the release tab and the adapter is secured by the thread grips in the female lens housing threads.
Figure 6:
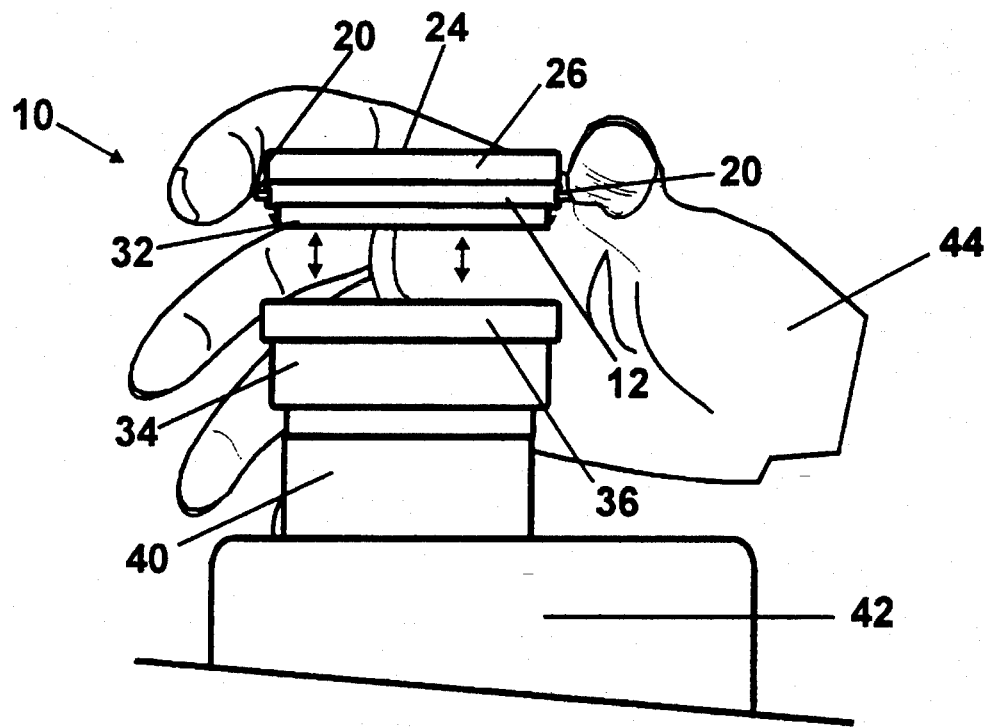
FIG. 6 showing the assembled filter ring and the quick-release adapter ring of this invention being hand-held for installation to or removal from a camera lens. Pressure is required on the release tabs for installation as well as for removal.

In FIG. 5, filter 24 is held by hand 44 with the fingers of hand 44 on release tabs 16. This is the manner of holding release tabs 16 for removing filter 24 from attachment to camera lens collar 36. FIG. 6 illustrates this removal. For installation, when release tabs 20 are pressed by the fingers of hand 44, adapter ring 12 will slide-attach to female camera lens threads 38 by being pushed down with unthreaded guide rim 32 directed into threads 38 inside of camera lens collar 36. The ease with which this attachment occurs and the security of the attachment makes changing lenses 24 safe and quickly accomplished. Removal is the simple act of manually squeezing release tabs 20 in the manner shown in FIGS. 5 and 6 and withdrawing adapter ring 12 from camera lens collar 36.

Figure 7:
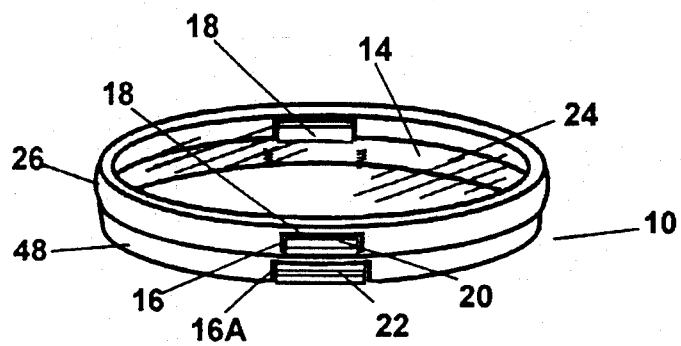
FIG. 7 showing a camera filter with the quick-release mechanism of the present invention installed directly into the ring. This illustrates that the filter ring could actually be manufactured with the adapter of this invention installed. However, the adapter being a separate ring allows a variety of available filters to be changed quickly and easily.
Figure 8:
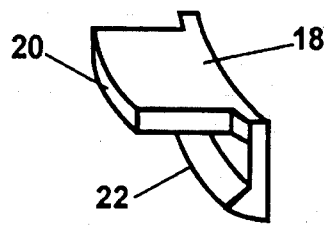
FIG. 8 showing a perspective view of the release tab and thread grip structure as it would be positioned installed in the adapter ring.
Figure 9:
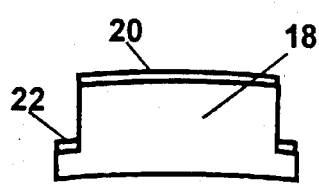
FIG. 9 showing the release tab and thread grip structure in a back view with the release tab positioned vertically.
Figure 10:
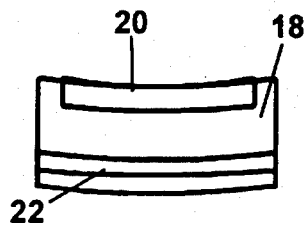
FIG. 10 showing a frontal side view of the tab structure.
Figure 11:
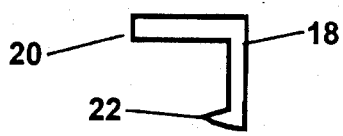
FIG. 11 showing a side profile of the release tab and thread grip structure.
Figure 12:
FIG. 12 showing a bottom plan view of the tab structure illustrating the rounded shape of the device allowing it to fit the contour of the adapter ring.

FIG. 7 illustrates the versatility of invention 10. Shown here, the operational parts of invention 10 are installed directly in filter ring 26 of filter 24. The openings are the same and connecting and disconnecting filter 24 from camera lens collar 36 is the same as if adapter ring 12 were used. A plain lower ring without threads 48 replaces the threaded original lower ring of filter 24.

Figure 13:
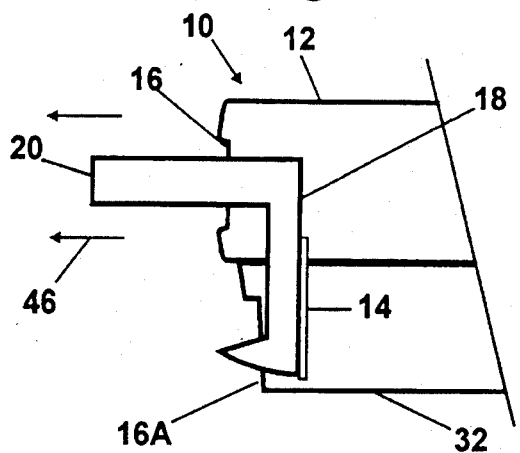
Figure 14:
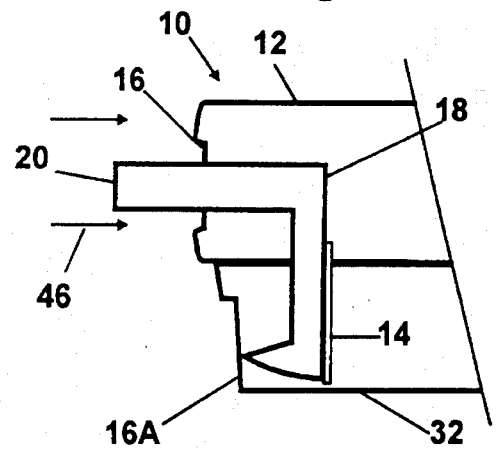

Release tab and threaded grip structure 18 is shown in various views in FIGS. 8, 9, 10, 11, and 12. Release tab and threaded grip structure 18 along with circular flat compression spring 14 are the principal working parts of invention 10. Release tab 20 and thread grip 22 are built into structure 18 in parallel alignment so both protrude from adapter ring 12 similarly with release tab 20 somewhat longer than thread grip 22. This is illustrated in FIGS. 13 and 14. In opened drawing views of one side of adapter ring 12, release tab 20 and thread grip 22 can be seen protruding out from openings 16 and 16A. Compression spring 14 is shown keeping structure 18 pressed against the walls of adapter ring 12 and unthreaded base ring 32 in FIG. 13. In FIG. 13, the device of invention 10 is in the attach position. Arrows 46 show the direction of force. In FIG. 14, Structure 18 is in the release position. Release tab 20 has been manually pressed in and thread grip 22 is in the detach position. Spring 14 is being held back by the manual pressure on release tab 20. When that pressure is released, structure 18 will return to the position shown in FIG. 13.

From a reading of the forgoing, those familiar with the art should understand the assemblage and advantages of the present invention over available camera equipment attachment devices. And even though we have described a particular embodiment of our invention in the specification and pictured it detailed in the drawings, it is to be understood that this is for concept illustration only. There may be minor changes in the end product which we reserve the right to make so long as changes made remain within the scope of our appended claims. Also, changes by others that produce a similar end product is not to be allowed if any of the end product concept falls within the scope of our claims.

What we claim as our invention is:

1. A camera filter quick release adapter comprising:
   a. an adapter ring, said adapter ring having a collar with an extended rim, said rim angled inward from said adapter ring collar to an opened circular center sufficient for slide insertion of said rim into an industry standard camera lens collar adjacent female threads therein, said rim having opposing rectangular openings therethrough, said adapter ring having opposing rectangular openings therethrough in parallel stacked alignment with said openings in said rim;
   b. means for quick temporary attachment of said adapter ring to said female threads in said camera lens collar with said adapter ring collar seated against said camera lens collar and quick release thereof;
   c. means for returning said temporary attachment means to a remembered position;
   d. means for temporary attachment of camera filters and other compatible photographic equipment to said adapter ring.

2. The camera filter quick release adapter of claim 1 wherein said means for quick temporary attachment of said adapter ring to said female threads in said camera lens collar with said adapter ring collar seated against said camera lens collar and release thereof includes a release tab member combined in a single device with a thread grip member, said release tab member and said thread grip member aligned one above the other affixed to a common back, said release tab member and said thread grip member sized to pass through said rectangular openings in said adapter with said release tab member protruding from said rectangular opening in said collar and said thread grip member protruding through said rectangular opening in said adapter collar rim, said common back curved to the contour of said adapter rim.

3. The camera filter quick release adapter of claim 1 wherein said means for returning said temporary attachment means to a remembered position includes a flat circular compression spring sized to an inside contour of said adapter ring.

4. The camera filter quick release adapter of claim 1 wherein said means for temporary attachment of camera filters and other compatible photographic equipment to said adapter ring includes female threads on an inside wall of said adapter ring collar.

5. The camera filter quick release adapter of claim 1 wherein said adapter ring has a camera filter as a part thereof.

* * * * *